(12) United States Patent
Nagaosa

(10) Patent No.: US 11,063,287 B2
(45) Date of Patent: Jul. 13, 2021

(54) FUEL CELL STACK HAVING FIXING MECHANISMS

(71) Applicant: Toyota Jidosha Kabushiki Kaisha, Toyota (JP)

(72) Inventor: Hideo Nagaosa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 16/273,425

(22) Filed: Feb. 12, 2019

(65) Prior Publication Data

US 2019/0252711 A1 Aug. 15, 2019

(30) Foreign Application Priority Data

Feb. 13, 2018 (JP) .............................. JP2018-023514

(51) Int. Cl.
| | |
|---|---|
| *H01M 8/248* | (2016.01) |
| *H01M 8/00* | (2016.01) |
| *H01M 8/243* | (2016.01) |
| *H01M 8/2475* | (2016.01) |

(52) U.S. Cl.
CPC ........... *H01M 8/248* (2013.01); *H01M 8/004* (2013.01); *H01M 8/243* (2013.01); *H01M 8/2475* (2013.01); *H01M 2250/20* (2013.01)

(58) Field of Classification Search
CPC ...... H01M 8/248; H01M 8/004; H01M 8/243; H01M 8/2475
See application file for complete search history.

(56) References Cited

U.S. PATENT DOCUMENTS

2018/0062194 A1* 3/2018 Naito .................. H01M 8/2485

FOREIGN PATENT DOCUMENTS

| CN | 203541567 U | * | 4/2014 |
| JP | 2007141637 A | | 6/2007 |
| JP | 2008053111 A | | 3/2008 |
| JP | 2008152942 A | | 7/2008 |

OTHER PUBLICATIONS

Huang Zihe, "CN-203541567-U Translated", EPO, Published Apr. 2014, Translated May 2020 (Year: 2014).*

* cited by examiner

*Primary Examiner* — Jimmy Vo
(74) *Attorney, Agent, or Firm* — Dinsmore & Shohl LLP

(57) ABSTRACT

A fuel cell stack includes: a stacked body including unit cells stacked; end plates sandwiching the stacked body in a stacking direction in which the unit cells are stacked; a tension plate fastening the end plates; and fixing mechanisms fixing the tension plate to the end plates.

10 Claims, 5 Drawing Sheets

FUEL CELL STACK HAVING FIXING MECHANISMS

CROSS-REFERENCE TO RELATED APPLICATION

This application is based upon and claims the benefit of priority of the prior Japanese Patent Application No. 2018-023514, filed on Feb. 13, 2018, the entire contents of which are incorporated herein by reference.

TECHNICAL FIELD

The present disclosure relates to a fuel cell stack.

BACKGROUND

There is known a fuel cell stack that includes a stacked body including stacked unit cells, and end plates sandwiching the stacked body from the stacking direction. In such a fuel cell stack, in consideration of reducing a contact resistance between the unit cells and ensuring a sealing property therebetween, a pair of the end plates is preferably fastened by a tension plate so that a desired pressure can be applied to the stacked body in the stacking direction. The tension plate is fixed to the end plate as follows. A bolt hole is formed in an outer peripheral edge of the end plate. A through hole is formed in the tension plate so as to be aligned with the bolt hole. The tension plate is fixed to the end plate by screwing the bolt into the bolt hole through the through hole from the tension plate in a state where the through hole and the bolt hole are aligned with each other (see, for example, Japanese Unexamined Patent Application Publication No. 2008-152942).

In order to suppress an increase in size of the fuel cell stack, it is considered to make the tension plate thin. However, in a case where the tension plate is thinned, the durability of the tension plate might deteriorate. Herein, for example, in a case where the fuel cell stack is mounted on the vehicle, slippage might occur between a seat surface of the bolt and the tension plate due to a driving vibration or the like, so that a local load might exert on an inner circumference of the through hole of the tension plate from a shaft portion of the bolt. This might enlarge the through hole. When the through hole of the tension plate is enlarged, rattling might occur between the through hole and the bolt, and the pressure in the stacking direction applied to the stacked body might decrease.

SUMMARY

It is an object of the present disclosure to provide a fuel cell stack suppressing a decrease in pressure applied to a stacked body in a stacking direction.

The above object is achieved by a fuel cell stack including: a stacked body including unit cells stacked; end plates sandwiching the stacked body in a stacking direction in which the unit cells are stacked; a tension plate fastening the end plates; and fixing mechanisms fixing the tension plate to the end plates, wherein at least one of the fixing mechanisms includes: a recessed portion formed in an outer peripheral edge of one of the end plates; a bolt hole formed in the one of the end plates, formed concentrically with the recessed portion, and having an inner diameter smaller than the recessed portion; a through hole formed in the tension plate; a sleeve formed into a cylindrical shape with a through hole, and fitted into the through hole of the tension plate and the recessed portion; and a bolt penetrating through the through hole of the sleeve and screwed into the bolt hole, the through hole of the tension plate includes a tapered inner peripheral surface whose inner diameter gradually decreases toward the one of the end plates in an axial direction of the bolt, the sleeve includes a tapered outer peripheral surface whose outer diameter gradually decreases toward the one of the end plates in the axial direction, and the tapered outer peripheral surface is in surface contact with the tapered inner peripheral surface.

The tapered outer peripheral surface of the sleeve is in surface contact with the tapered inner peripheral surface of the through hole of the tension plate, thereby ensuring a contact area between both surfaces and bringing both surfaces into close contact with each other. It is thus possible to suppress local load concentration on the tapered inner peripheral surface of the through hole of the tension plate and to suppress enlargement of the through hole of the tension plate. As a result, occurrence of rattling between the sleeve and the tension plate is suppressed, and a decrease in pressure in the stacking direction applied to the stacked body is suppressed.

The recessed portion may include a cylindrical inner peripheral surface whose inner diameter is constant in the axial direction, the sleeve may include a cylindrical outer peripheral surface whose outer diameter is constant in the axial direction from the tapered outer peripheral surface, and the cylindrical inner peripheral surface may be fitted with the cylindrical outer peripheral surface.

A chamfered portion may be formed at an opening edge of the recessed portion so as to avoid contact with the tapered outer peripheral surface.

A depth of the recessed portion in the axial direction may be greater than a length of the cylindrical outer peripheral surface of the sleeve in the axial direction.

An inner diameter of the through hole of the sleeve may be greater than an outer diameter of a shaft portion, by a predetermined amount, of the bolt penetrating through the through hole of the sleeve.

DETAILED DESCRIPTION

Figure 1:
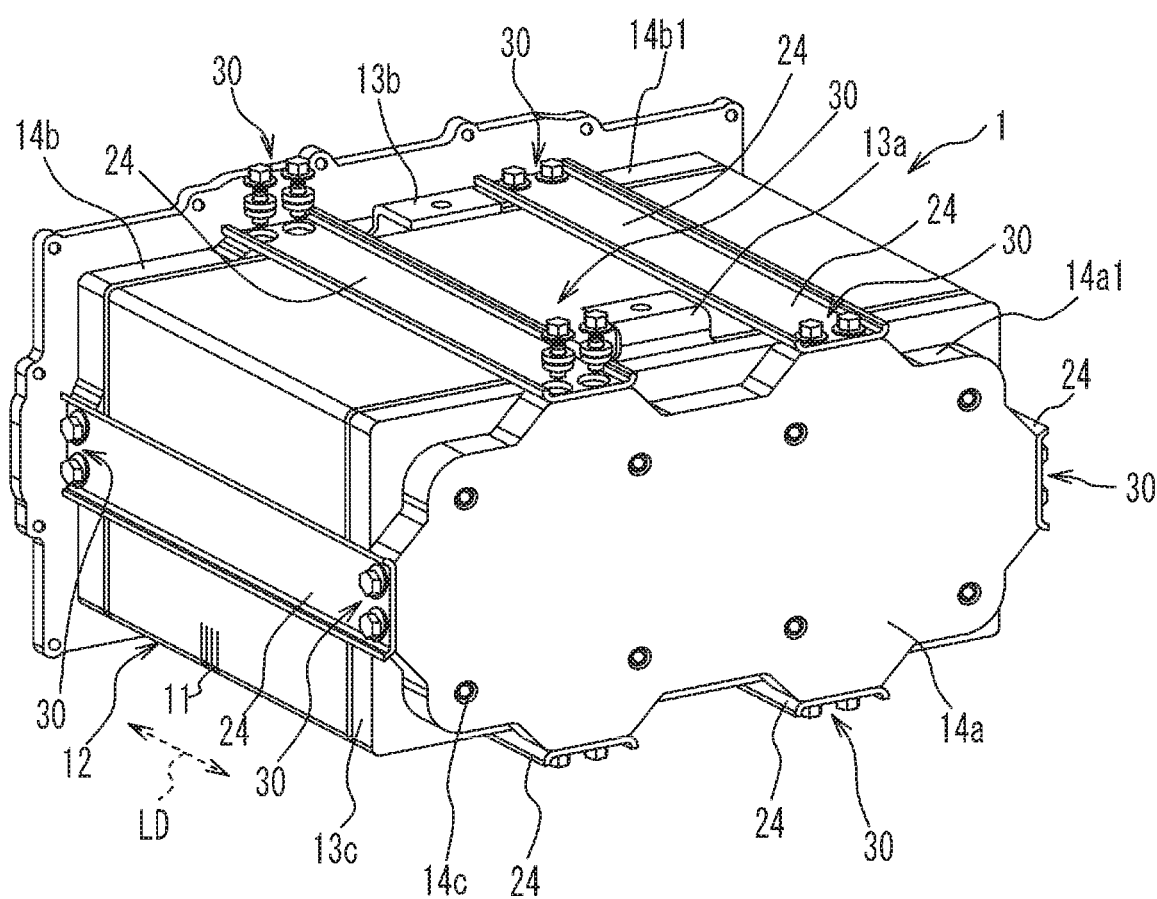
FIG. 1 is a perspective view of a fuel cell stack according to the present embodiment.

FIG. 1 is a perspective view of a fuel cell stack 1 (hereinafter referred to as a stack 1) according to the present embodiment. The stack 1 includes a stacked body 12, end plates 14a and 14b, tension plates 24, and fixing mechanisms 30. The stacked body 12 includes stacked unit cells 11, terminal plates 13a and 13b arranged at respective end portions of these unit cells 11, and a pressure plate 13c arranged between the terminal plate 13a and the end plate 14a. FIG. 1 illustrates a stacking direction LD in which the unit cells 11 and the like are stacked. The unit cell 11 is a polymer electrolyte fuel cell that generates electric power by being supplied with a fuel gas (for example, hydrogen) and an oxidant gas (for example, air) as reaction gases. The terminal plates 13a and 13b are arranged so as to sandwich the unit cells 11. In the present embodiment, each of the terminal plates 13a and 13b has a terminal portion for extracting the generated electric power from the stack 1 to the outside and protruding outside the stacked body 12.

The end plates 14a and 14b sandwich the stacked body 12 in the stacking direction LD, and the end plates 14a and 14b are fastened by the tension plates 24 so as to apply a desired pressure to the stacked body 12 in the stacking direction LD. This ensures a decrease in contact resistance between the unit cells 11, and ensures a sealing property between the unit cells 11. Each of the end plates 14a and 14b is made of, for example, a metal. The end plate 14b includes a portion protruding in a direction perpendicular to the stacking direction LD from the stacked body 12. For example, in a case of mounting the stack 1 on a vehicle, the end plate 14b is fixed to a member constituting the vehicle body. The end plate 14b is provided with supply ports for supplying the fuel gas, the oxidant gas, and the cooling water to the unit cells 11, and discharge ports for discharging them.

The tension plate 24, facing an outer peripheral surface of the stacked body 12, extends in the stacking direction LD and fastens the end plates 14a and 14b. Specifically, the tension plate 24 is fixed to outer peripheral edges 14a1 and 14b1 of the respective end plates 14a and 14b such that a desired pressure in the stacking direction LD is applied to the stacked body 12 by the end plates 14a and 14b. The tension plate 24 is made of a metal. The tension plates 24 are provided around the stacked body 12. The tension plate 24 is formed thinner than its length in the longitudinal direction and its width in the short direction perpendicular to the longitudinal direction. This suppresses an increase in size of the stack 1, specifically, in a plane direction perpendicular to the stacking direction LD. The fixing mechanism 30 is a mechanism for fixing the tension plate 24 to the end plates 14a and 14b. The fixing mechanism 30 will be described later.

The pressure plate 13c arranged between the end plate 14a and the terminal plate 13a is pressed by end portions of adjustment screws 14c attached to the end plate 14a. Specifically, by adjusting a screwing amount of the adjustment screw 14c into a screw hole formed in the end plate 14a, a protruding amount of the adjustment screw 14c toward the pressure plate 13c from the end plate 14a is adjusted. Thus, the pressure in the stacking direction LD applied to the stacked body 12 is finely adjusted. In addition, each insulator not illustrated for ensuring insulation is provided between the terminal plate 13a and the pressure plate 13c and between the terminal plate 13b and the end plate 14b.

Figure 2:
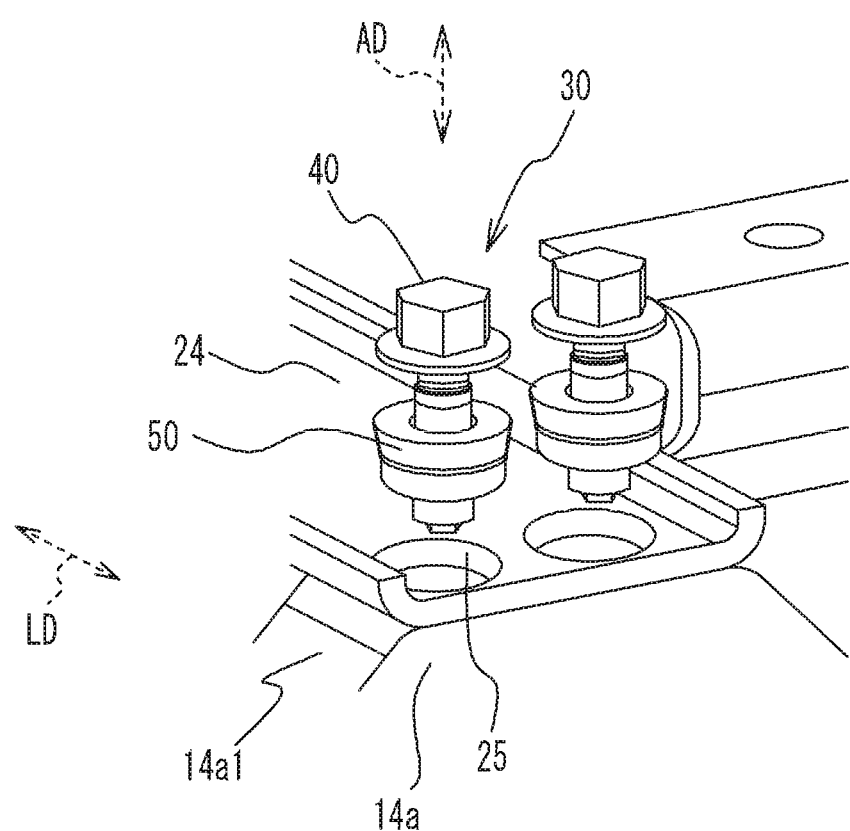
FIG. 2 is a partially enlarged view of FIG. 1.

Next, the fixing mechanism 30 will be described. One end of the tension plate 24 is fixed to the end plate 14a by the two fixing mechanisms 30, and the other end of the tension plate 24 is also fixed to the end plate 14b by the two fixing mechanisms 30. FIG. 2 is a partially enlarged view of FIG. 1. The fixing mechanism 30 includes a bolt 40, a sleeve 50 through which the bolt 40 penetrates, a through hole 25 formed in the tension plate 24, and the like. As will be described in detail later, the bolt 40 is screwed into a bolt hole formed in the end plate 14a so as to fix the sleeve 50 to the end plate 14a by the bolt 40, and the tension plate 24 is fixed to the end plate 14a by the sleeve 50. The bolt 40 fixes the sleeve 50 to the end plate 14a in a posture in which an axial direction AD of the bolt 40 is perpendicular to the stacking direction LD.

Figure 3:
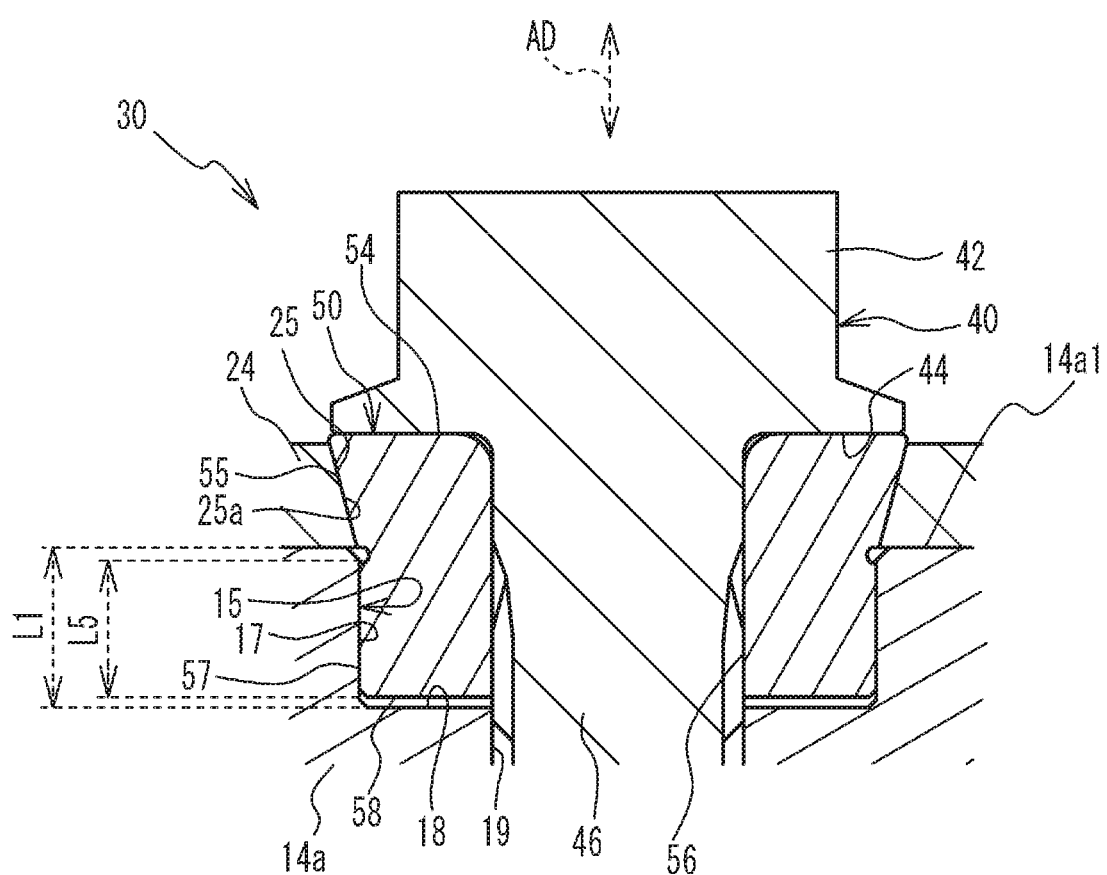
FIG. 3 is a cross-sectional view illustrating a periphery of a fixing mechanism fixing a tension plate to an end plate.

FIG. 3 is a cross-sectional view illustrating the periphery of the fixing mechanism 30 fixing the tension plate 24 to the end plate 14a. Although not illustrated in FIG. 2, a recessed portion 15 is formed on the outer peripheral edge 14a1 of the end plate 14a as illustrated in FIG. 3. The recessed portion 15 has a circular shape when viewed in the axial direction AD of the bolt 40. Specifically, the recessed portion 15 includes a cylindrical inner peripheral surface 17 and a bottom surface 18. A bolt hole 19 is formed in the end plate 14a. The bolt hole 19, formed concentrically with the recessed portion 15, has an inner diameter smaller than that of the recessed portion 15. An inner peripheral surface of the bolt hole 19 is formed with a thread groove to be screwed with a shaft portion 46 of the bolt 40 described later. In addition, the fixing mechanism 30 includes not only the bolt 40 and the sleeve 50 but also the recessed portion 15 and the bolt hole 19 that are formed in the end plate 14a.

The through hole 25 of the tension plate 24 includes a tapered inner peripheral surface 25a whose inner diameter gradually decreases toward the end plate 14a in the axial direction AD. The minimum inner diameter of the tapered inner peripheral surface 25a is substantially equal to or greater than the inner diameter of the cylindrical inner peripheral surface 17 of the recessed portion 15 of the end plate 14a. Additionally, the fixing mechanism 30 also includes the through hole 25 of the tension plate 24. The through hole will be described later in detail.

The bolt 40, made of a metal, includes a head portion 42, a seat surface 44, and the shaft portion 46. The shaft portion 46 is screwed into the bolt hole 19 of the end plate 14a. An outer diameter of the seat surface 44 is larger than each outer diameter of the head portion 42 and the shaft portion 46. The shaft portion 46, formed with a screw thread on the outer peripheral surface thereof, is screwed into the thread groove of the bolt hole 19.

The sleeve 50, made of a metal and formed into a substantially cylindrical shape, is fitted into the through hole 25 of the tension plate 24 and the recessed portion 15 of the end plate 14a. The sleeve 50 includes an upper surface 54, a tapered outer peripheral surface 55, a through hole 56, a cylindrical outer peripheral surface 57, and a bottom surface 58. The upper surface 54 in contact with the seat surface 44 of the bolt 40 is pressed toward the end plate 14a. Additionally, the outer diameter of the seat surface 44 of the bolt 40 is smaller than that of the upper surface 54 such that the seat surface 44 does not protrude outside the sleeve 50. The shaft portion 46 of the bolt 40 penetrates through the through hole 56. Unlike the bolt hole 19, the through hole 56 is formed into a smooth cylindrical shape without forming the thread groove on the inner peripheral surface thereof. The outer diameter of the tapered outer peripheral surface 55 gradually decreases toward the end plate 14a in the axial direction AD. On the other hand, the outer diameter of the cylindrical outer peripheral surface 57 is constant in the axial direction AD. As compared with the tapered outer peripheral surface 55, the cylindrical outer peripheral surface 57 is close to the end plate 14a. The outer diameter of the cylindrical outer peripheral surface 57 is substantially equal to or smaller than the minimum value of the outer diameter of the tapered outer peripheral surface 55. The tapered outer peripheral surface 55 is in contact with the tapered inner peripheral surface 25a of the through hole 25 of the tension plate 24. The cylindrical outer peripheral surface 57 is in contact with the cylindrical inner peripheral surface 17 of the recessed portion 15.

As described above, in a state where the sleeve 50 is fitted into the through hole 25 of the tension plate 24 and the recessed portion 15 of the end plate 14a, the shaft portion 46 of the bolt 40 is screwed into the bolt hole 19 through the through hole 56. Thus, the sleeve 50 is fixed to the end plate 14a. As described above, each diameter of the tapered inner peripheral surface 25a of the through hole 25 and the tapered outer peripheral surface 55 of the sleeve 50 gradually decreases toward the end plate 14a in the axial direction AD, in other words, each diameter gradually increases away from the end plate 14a in the axial direction AD. Therefore, in the state in which the sleeve 50 is fitted into the through hole 25 of the tension plate 24 fixed to the end plate 14a, the tension plate 24 is suppressed from being detached from the sleeve 50 away from the end plate 14a. That is, the fastening force between the end plate 14a and the bolt 40 exerts on the sleeve 50, and the force exerting on the sleeve 50 exerts on the tension plate 24, thereby fixing the tension plate 24 to the end plate 14a. The same applies to the fixing mechanisms 30 that fix the other tension plates 24 to the end plate 14b.

The tapered inner peripheral surface 25a of the through hole 25 and the tapered outer peripheral surface 55 of the sleeve 50, each formed into a tapered shape with substantially the same gradient, are in surface contact with each other. As a result, the contact area between the tapered inner peripheral surface 25a and the tapered outer peripheral surface 55 is ensured to maintain a close contact state. Since both surfaces are in close contact with each other in such a manner, the load applied to the tapered inner peripheral surface 25a from the tapered outer peripheral surface 55 is dispersed, thereby suppressing the local load concentration on the tapered inner peripheral surface 25a. This suppresses enlargement of the through hole 25. For example, even when vibration of the vehicle equipped with the stack 1 is transmitted thereto, the enlargement of the through hole 25 is suppressed, since the tapered inner peripheral surface 25a is in close contact with the tapered outer peripheral surface 55. Accordingly, a decrease in pressure in the stacking direction LD applied to the stacked body 12 is suppressed.

For example, it is considered that an inner peripheral surface of a through hole of the tension plate whose inner diameter is constant in the axial direction is in contact with an outer peripheral surface of a sleeve whose outer diameter is constant in the axial direction. In this case, it might be difficult to bring the inner peripheral surface of the through hole of the tension plate and the outer peripheral surface of the sleeve into uniform contact with each other, due to a dimensional error, assembly error, or the like caused by processing accuracy. Thus, it might be difficult to stably ensure the contact area between both surfaces. Accordingly, the stress might concentrate on a part of the inner peripheral surface of the through hole of the tension plate, which might enlarge the through hole of the tension plate. In particular, in the case where the tension plate 24 is thin like the present embodiment, such a problem tends to occur. In the present embodiment, as described above, the tapered inner peripheral surface 25a and the tapered outer peripheral surface 55 are tapered and are brought into close and surface contact with each other, thereby suppressing the enlargement of the through hole 25.

Further, as described above, the thread groove is not formed in the through hole 56 of the sleeve 50, and the inner diameter of the through hole 56 is larger than the outer diameter of the shaft portion 46 of the bolt 40 by a predetermined amount. For this reason, in a state in which the bolt 40 is inserted into the through hole 56, the sleeve 50 can slightly move relative to the bolt 40. Since the sleeve 50 can slightly move relative to the bolt 40 in such a way, it is possible to absorb dimensional errors and the like of each member, and to bring the tapered outer peripheral surface 55 of the sleeve 50 and the tapered inner peripheral surface 25a of the through hole 25 into close contact with each other. Further, a difference between the inner diameter of the through hole 56 and the outer diameter of the shaft portion 46 of the bolt 40 may be set in consideration of a dimensional error and the like of each member, and may be, for example, 0.5 mm or more, 1.0 mm or more, or 1.5 mm or more.

In addition, the outer diameter of the cylindrical outer peripheral surface 57 is constant in the axial direction AD, and the inner diameter of the cylindrical inner peripheral surface 17 is also constant in the axial direction AD. For example, it is considered that the cylindrical outer peripheral surface 57 and the cylindrical inner peripheral surface 17 are each formed into a tapered shape such that its diameter gradually decreases toward the end plate 14a in order to be in surface contact with each other, like the tapered outer peripheral surface 55 and the tapered inner peripheral surface 25a. In this case, the recessed portion 15 and the sleeve 50 might be brought into excessively close contact with each other, and it might be difficult to detach the sleeve 50 from the recessed portion 15. A case of detaching the sleeve 50 from the recessed portion 15 is assumed as follows. For example, when a few unit cells 11 are needed to be replaced in consideration of test results of the completed stack 1, the stack 1 may be disassembled. In such a case, if it is difficult to detach the sleeve 50 from the recessed portion 15, it might be also difficult to detach the tension plate 24 fixed to the end plate 14a by the sleeve 50, so the disassembling workability of the stack 1 might deteriorate. In the present embodiment, since each diameter of the cylindrical outer peripheral surface 57 and the cylindrical inner peripheral surface 17 is constant in the axial direction AD, the recessed portion 15 and the sleeve 50 are suppressed from coming into excessively close contact with each other, which suppresses the deterioration of the disassembling workability.

FIG. 3 illustrates a depth L1 of the recessed portion 15 and a length L5 of the cylindrical outer peripheral surface 57 of the sleeve 50. The depth L1 is greater than the length L5. That is, the tension plate 24 is fixed to the end plate 14a with the bottom surface 58 of the sleeve 50 not contacting with the bottom surface 18 of the recessed portion 15. For example, if the bottom surfaces 58 and 18 are in contact with each other, the pressing force exerting on the sleeve 50 from the bolt 40 is dispersed not only to the tension plate 24 but also to the end plate 14a. Thus, the force applied to the tension plate 24 from the sleeve 50 might decrease, so the tension plate 24 cannot be fixed to the end plate 14a with sufficient force. Since the bottom surfaces 58 and 18 do not contact with each other as described above in the present embodiment, the force applied to the sleeve 50 from the bolt 40 can be transmitted to the tension plate 24 without being dispersed to the end plate 14a. Therefore, the tension plate 24 can be fixed to the end plate 14a with sufficient force.

Figure 4A:
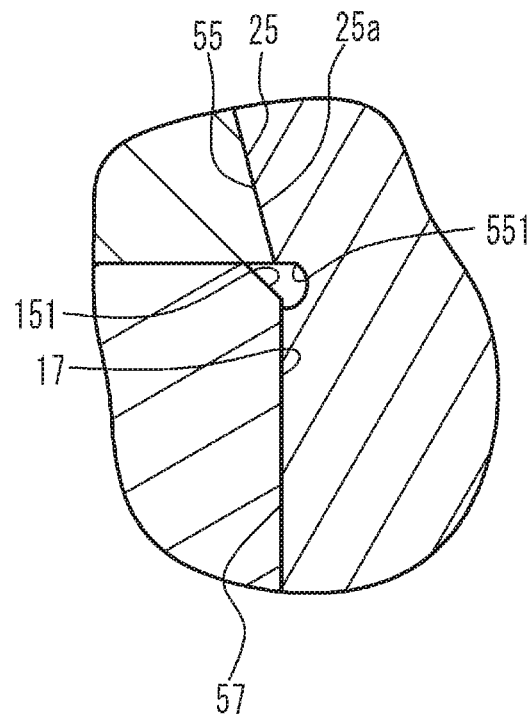
FIG. 4A is a partially enlarged view of FIG. 3.

FIG. 4A is a partially enlarged view of FIG. 3. A chamfered portion 151 is formed all around an opening edge of the recessed portion 15 of the end plate 14a. A depressed portion 551, extending in the peripheral direction of the sleeve 50 and having an annual shape, is formed between the tapered outer peripheral surface 55 and the cylindrical outer peripheral surface 57. The depressed portion 551 is inevitably formed in the manufacturing process, and the sleeve 50 is not limited to have the depressed portion 551.

Figure 4B:
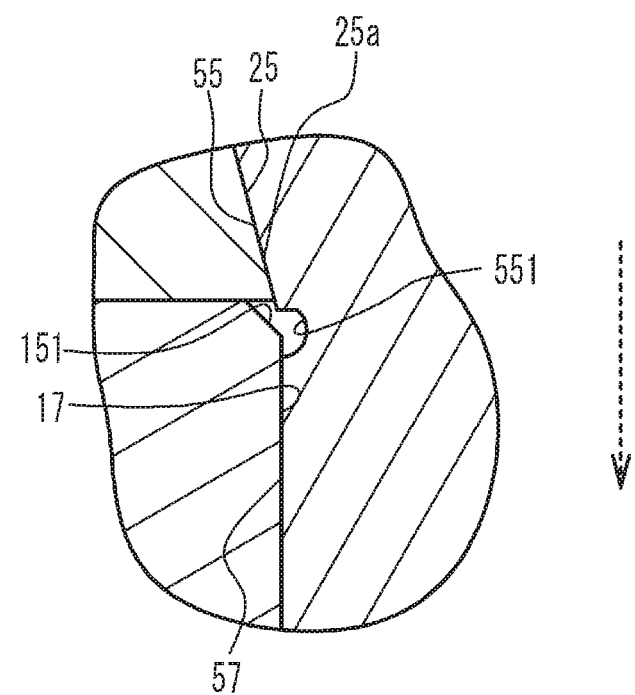
FIG. 4B is an enlarged view of a sleeve inserted deeply into a recessed portion.

FIG. 4B is an enlarged view of the sleeve 50 inserted deeply into the recessed portion 15. FIG. 4B corresponds to FIG. 4A. For example, due to a dimensional error or the like of each member, the sleeve 50 may be inserted deeply into the recessed portion 15 more than expected. Even in such a case, contact between the end plate 14a and the sleeve 50 is avoided by the chamfered portion 151. Even with such a configuration, the force applied to the sleeve 50 from the bolt 40 can be transmitted to the tension plate 24 without being dispersed to the end plate 14a, and it is thus possible to fix the tension plate 24 to the end plate 14a with sufficient force. In addition, since the chamfered portion 151 is formed, it is easy to insert the sleeve 50 into the recessed portion 15 when the tension plate 24 is fixed to the end plate 14a, and the assembling workability of the stack 1 is also improved.

In the present embodiment, the tension plates 24 are fixed to the end plates 14a and 14b by the fixing mechanisms 30, but at least one tension plate may be fixed to at least one of the end plates 14a and 14b by the fixing mechanism 30.

Figure 5:
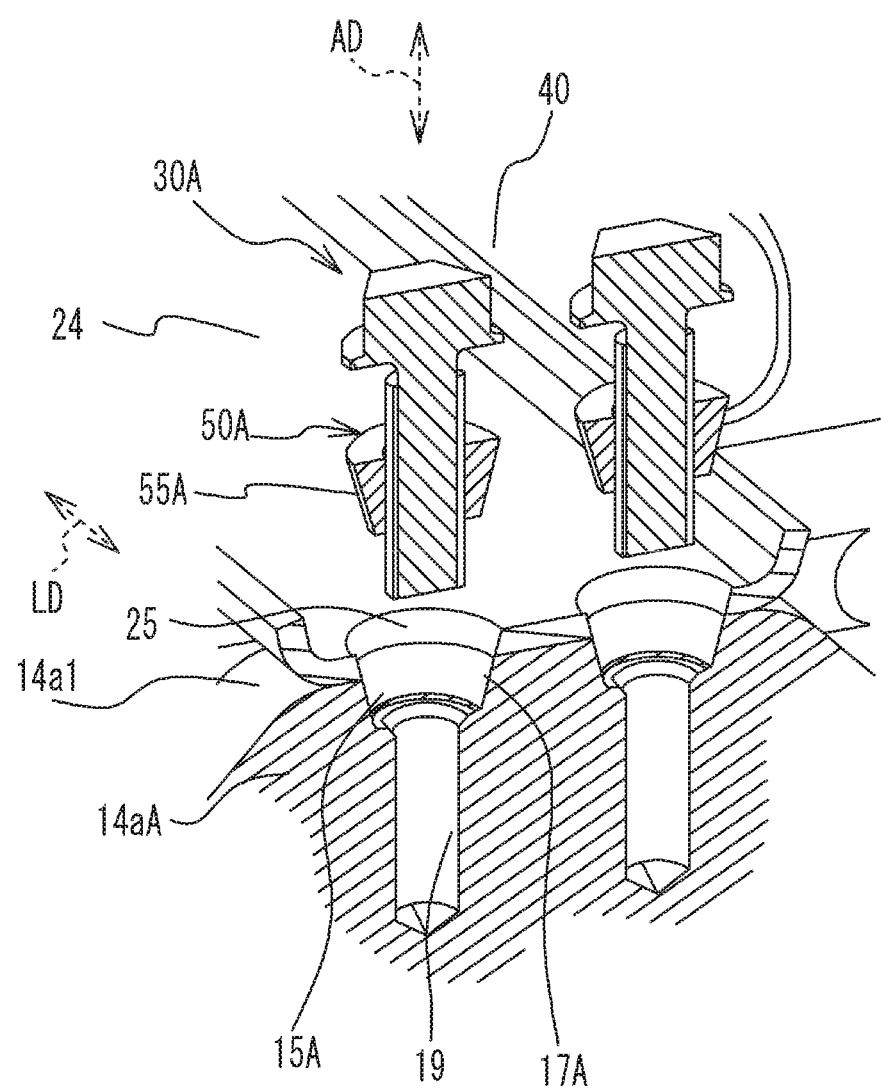
FIG. 5 is a view illustrating a cross section of a periphery of a fixing mechanism according to a variation.

Next, a variation will be described. In the variation, the same components are denoted by the same reference numerals, and duplicated explanation is omitted. FIG. 5 is a view illustrating a cross section of the periphery of a fixing mechanism 30A according to a variation. Unlike the above-described embodiment, a sleeve 50A of the fixing mechanism 30A is not formed with the cylindrical outer peripheral surface 57, but with a tapered outer peripheral surface 55A throughout the axial direction. Further, unlike the above-described embodiment, a recessed portion 15A of an end plate 14aA is not formed with the cylindrical inner peripheral surface 17 having a constant inner diameter, but with a tapered inner peripheral surface 17A having an inner diameter gradually decreasing toward the end plate 14aA. As described above, the sleeve 50A is easier to manufacture than the sleeve 50 in the above-described embodiment, which thereby suppressing an increase in manufacturing cost.

Although some embodiments of the present disclosure have been described in detail, the present disclosure is not limited to the specific embodiments but may be varied or changed within the scope of the present disclosure as claimed.

What is claimed is:

1. A fuel cell stack comprising:
a stacked body including unit cells stacked;
end plates sandwiching the stacked body in a stacking direction in which the unit cells are stacked;
a tension plate fastening the end plates; and
fixing mechanisms fixing the tension plate to the end plates,
wherein
at least one of the fixing mechanisms includes:
a recessed portion formed in an outer peripheral edge of one of the end plates;
a bolt hole formed in the one of the end plates, formed concentrically with the recessed portion, and having an inner diameter smaller than the recessed portion;
a through hole formed in the tension plate;
a sleeve formed into a cylindrical shape with a through hole, and fitted into the through hole of the tension plate and the recessed portion; and
a bolt penetrating through the through hole of the sleeve and screwed into the bolt hole,
the through hole of the tension plate includes a tapered inner peripheral surface whose inner diameter gradually decreases toward the one of the end plates in an axial direction of the bolt,
the sleeve includes a tapered outer peripheral surface whose outer diameter gradually decreases toward the one of the end plates in the axial direction, and
the tapered outer peripheral surface is in surface contact with the tapered inner peripheral surface.

2. The fuel cell stack of claim 1, wherein
the recessed portion includes a cylindrical inner peripheral surface whose inner diameter is constant in the axial direction,
the sleeve includes a cylindrical outer peripheral surface whose outer diameter is constant in the axial direction from the tapered outer peripheral surface, and
the cylindrical inner peripheral surface is fitted with the cylindrical outer peripheral surface.

3. The fuel cell stack of claim 2, wherein a chamfered portion is formed at an opening edge of the recessed portion so as to avoid contact with the tapered outer peripheral surface.

4. The fuel cell stack of claim 2, wherein a depth of the recessed portion in the axial direction is greater than a length of the cylindrical outer peripheral surface of the sleeve in the axial direction.

5. The fuel cell stack of claim 1, wherein an inner diameter of the through hole of the sleeve is greater than an outer diameter of a shaft portion, by a predetermined amount, of the bolt penetrating through the through hole of the sleeve.

6. A fuel cell stack comprising:
a stacked body including unit cells stacked;
end plates sandwiching the stacked body in a stacking direction in which the unit cells are stacked;
a tension plate fastening the end plates; and
fixing mechanisms fixing the tension plate to the end plates,
wherein
at least one of the fixing mechanisms includes:
a recessed portion formed in an outer peripheral edge of one of the end plates;
a bolt hole formed in the one of the end plates, formed concentrically with the recessed portion, and having an inner diameter smaller than the recessed portion;
a through hole formed in the tension plate;
a sleeve formed into a cylindrical shape with a through hole, and fitted into the through hole of the tension plate and the recessed portion; and
a bolt penetrating through the through hole of the sleeve and screwed into the bolt hole,
the through hole of the tension plate includes a tapered inner peripheral surface whose inner diameter gradually decreases toward the one of the end plates in an axial direction of the bolt,
the sleeve includes a tapered outer peripheral surface whose outer diameter gradually decreases toward the one of the end plates in the axial direction, and
the tapered outer peripheral surface is in surface contact with the tapered inner peripheral surface,
the recessed portion includes a cylindrical inner peripheral surface and a bottom surface, and
the tension plate is fixed to the end plate with the sleeve not in contact with the bottom surface of the recessed portion.

7. The fuel cell stack of claim 6, wherein
the recessed portion includes a cylindrical inner peripheral surface whose inner diameter is constant in the axial direction,
the sleeve includes a cylindrical outer peripheral surface whose outer diameter is constant in the axial direction from the tapered outer peripheral surface, and
the cylindrical inner peripheral surface is fitted with the cylindrical outer peripheral surface.

8. The fuel cell stack of claim 7, wherein a chamfered portion is formed at an opening edge of the recessed portion so as to avoid contact with the tapered outer peripheral surface.

9. The fuel cell stack of claim 7, wherein a depth of the recessed portion in the axial direction is greater than a length of the cylindrical outer peripheral surface of the sleeve in the axial direction.

10. The fuel cell stack of claim 6, wherein an inner diameter of the through hole of the sleeve is greater than an outer diameter of a shaft portion, by a predetermined amount, of the bolt penetrating through the through hole of the sleeve.

* * * * *